(12) United States Patent
Mitsumoto et al.

(10) Patent No.: US 8,687,155 B2
(45) Date of Patent: Apr. 1, 2014

(54) LIQUID CRYSTAL DISPLAY DEVICE

(75) Inventors: Takashi Mitsumoto, Ishikawa-gun (JP); Junichi Kobayashi, Nomi-gun (JP); Kazuhiro Joten, Kanazawa (JP)

(73) Assignee: Japan Display Inc., Tokyo (JP)

( * ) Notice: Subject to any disclaimer, the term of this patent is extended or adjusted under 35 U.S.C. 154(b) by 302 days.

(21) Appl. No.: 13/185,768

(22) Filed: Jul. 19, 2011

(65) Prior Publication Data
US 2012/0019753 A1 Jan. 26, 2012

(30) Foreign Application Priority Data
Jul. 22, 2010 (JP) ................ 2010-165210

(51) Int. Cl.
*G02F 1/1335* (2006.01)
*G02F 1/1343* (2006.01)

(52) U.S. Cl.
USPC ............................ 349/118; 349/141; 349/120

(58) Field of Classification Search
USPC ................................. 349/118–120
See application file for complete search history.

(56) References Cited

U.S. PATENT DOCUMENTS

| | | | |
|---|---|---|---|
| 6,995,824 B2 | 2/2006 | Joten | |
| 7,072,009 B2 | 7/2006 | Joten | |
| 7,081,934 B2 | 7/2006 | Joten | |
| 7,256,844 B2 | 8/2007 | Joten | |
| 7,499,134 B2 | 3/2009 | Yamada et al. | |
| 7,589,811 B2 | 9/2009 | Joten | |
| 2005/0200792 A1* | 9/2005 | Jeon et al. | 349/141 |
| 2006/0050216 A1 | 3/2006 | Joten | |
| 2007/0024792 A1* | 2/2007 | Chang et al. | 349/141 |
| 2007/0165165 A1 | 7/2007 | Joten | |
| 2007/0182892 A1* | 8/2007 | Higa et al. | 349/114 |
| 2009/0046234 A1* | 2/2009 | Tanaka | 349/141 |

FOREIGN PATENT DOCUMENTS

| | | |
|---|---|---|
| JP | 2006-524347 | 10/2006 |
| JP | 2009-203426 | 9/2009 |
| JP | 2010-39432 | 2/2010 |

OTHER PUBLICATIONS

Japanese Office Action issued Jul. 2, 2013, in Japan patent Application No. 2010-165210 (with English translation).

* cited by examiner

*Primary Examiner* — Edward Glick
*Assistant Examiner* — Dennis Y Kim
(74) *Attorney, Agent, or Firm* — Oblon, Spivak, McClelland, Maier & Neustadt, L.L.P.

(57) ABSTRACT

According to one embodiment, a liquid crystal display device includes a first insulative substrate, a second insulative substrate, a first polarizer disposed on an outer surface side of the first insulative substrate, a second polarizer disposed on an outer surface side of the second insulative substrate, and a first retardation plate and a second retardation plate, which are stacked between the second insulative substrate and the second polarizer. When a retardation in the thickness direction, which is defined by $((n_x+n_y)/2-n_z)*d$, is Rth, the first retardation plate has a negative first retardation Rth1, the second retardation plate has a positive second retardation Rth2, and a contribution degree of the second retardation Rth2, which is defined by $|Rth2|*100/(|Rth1|+|Rth2|)$, is 40%±3%.

16 Claims, 10 Drawing Sheets

|  |  | Present embodiment |
|---|---|---|
| Second retardation plate RP2 | Re2 (nm) | 115 |
|  | Rth2 (nm) | 103.5 |
| First retardation plate RP1 | Re1 (nm) | 0 |
|  | Rth1 (nm) | -150 |
|  | Re (sum) (nm) | 115 |
|  | Rth (sum) (nm) | -46.5 |

$$CNT2 = \frac{|Rth2| \times 100}{|Rth1| + |Rth2|} = 40.8\%$$

|  |  | Present embodiment ||| Comparative example1 | Comparative example2 |
|---|---|---|---|---|---|---|
|  |  | Modification 1 | Modification 2 | Modification 3 |  |  |
| Second retardation plate RP2 | Re2 (nm) | 100 | 101.5 | 55.3 | / | 90 |
|  | Rth2 (nm) | 90 (CNT2=37.5%) | 69.3 (CNT2=42.7%) | -88.4 | / | 99 (CNT2=36.8%) |
| First retardation plate RP1 | Re1 (nm) | 0 | 19.8 | 76.3 | / | 0 |
|  | Rth1 (nm) | -150 | -93 | 66 (CNT1=42.7%) | / | -170 |
|  | Re (sum) (nm) | 100 | 121.3 | 131.6 | 0 | 90 |
|  | Rth (sum) (nm) | -60 | -23.7 | -22.4 | 0 | -71 |

F I G. 10

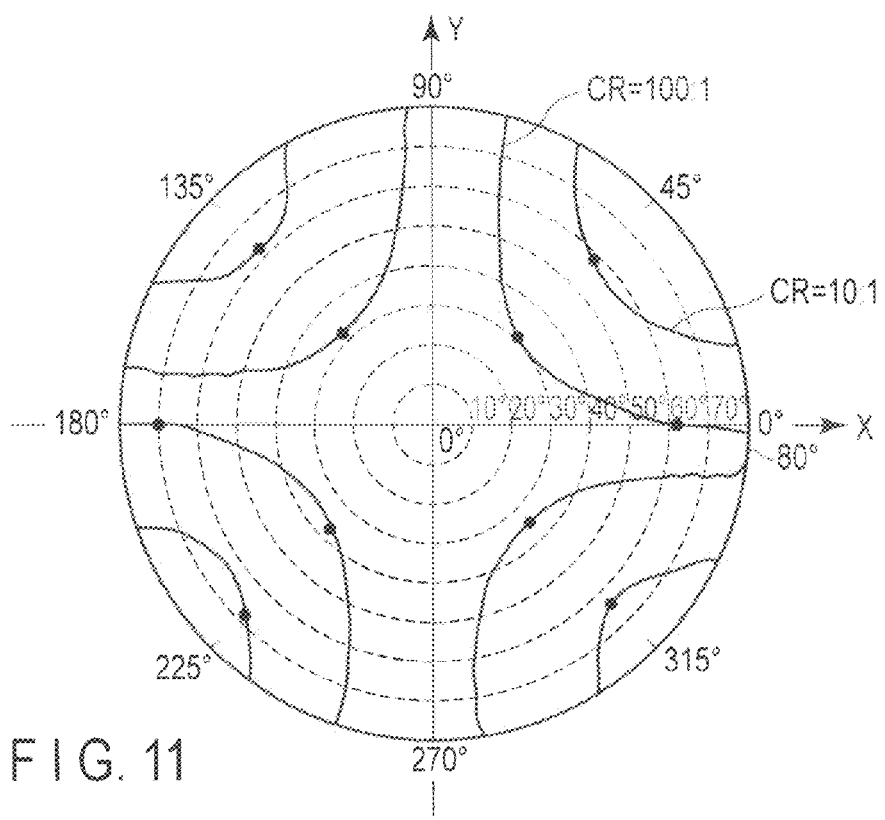
F I G. 11
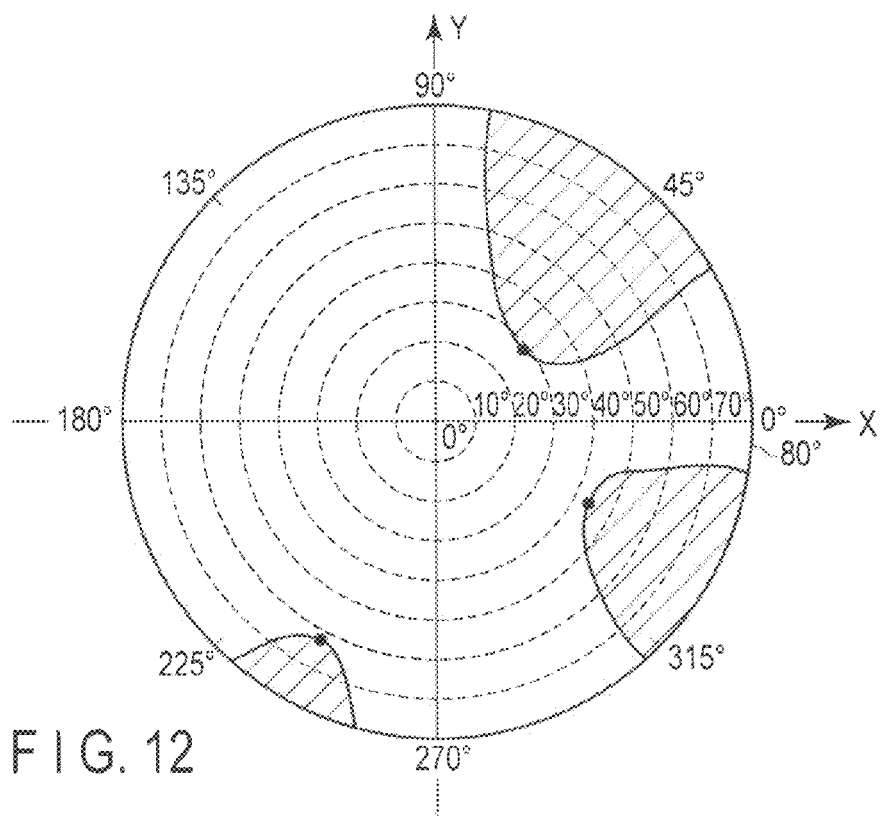
F I G. 12

LIQUID CRYSTAL DISPLAY DEVICE

CROSS-REFERENCE TO RELATED APPLICATIONS

This application is based upon and claims the benefit of priority from prior Japanese Patent Application No. 2010-165210, filed Jul. 22, 2010, the entire contents of which are incorporated herein by reference.

FIELD

Embodiments described herein relate generally to a liquid crystal display device.

BACKGROUND

By virtue of such features as light weight, small thickness and low power consumption, liquid crystal display devices have been used in various fields as display devices of OA equipment such as a personal computer, a TV, etc. In recent years, liquid crystal display devices have also been used as display devices of a portable terminal device such as a mobile phone, a car navigation apparatus, a game machine, etc.

In such liquid crystal display devices, in some cases, retardation films are disposed to optically compensate retardation due to birefringence of a liquid crystal layer in a frontal direction and an oblique direction. As such retardation films, there have been proposed retardation films in which, when the refractive indices in an in-plane slow axis direction, an in-plane fast axis direction and a thickness direction are nx, ny and nz, respectively, the in-plane retardation value (also referred to as "in-plane retardation Re" in this specification) defined by $(nx-ny)*d$ or the thickness-directional retardation value (also referred to as "retardation Rth in the thickness direction" in this specification) defined by $((nx+ny)/2-nz)*d$ is set in various ranges.

BRIEF DESCRIPTION OF THE DRAWINGS

FIG. 10 is a view for explaining the characteristics of first retardation plates and second retardation plates which are applicable to Modifications 1, 2 and 3 of the embodiment, Comparative Example 1 in which neither the first retardation plate nor second retardation plate is applied, and the characteristics of a first retardation plate and a second retardation plate of Comparative Example 2.

FIG. 11 shows a simulation result of viewing angle characteristics of the contrast ratio in a liquid crystal display device of Comparative Example 1.

FIG. 12 shows a simulation result of viewing angle characteristics of the gray level inversion in the liquid crystal display device of Comparative Example 1.

DETAILED DESCRIPTION

Figure 1:
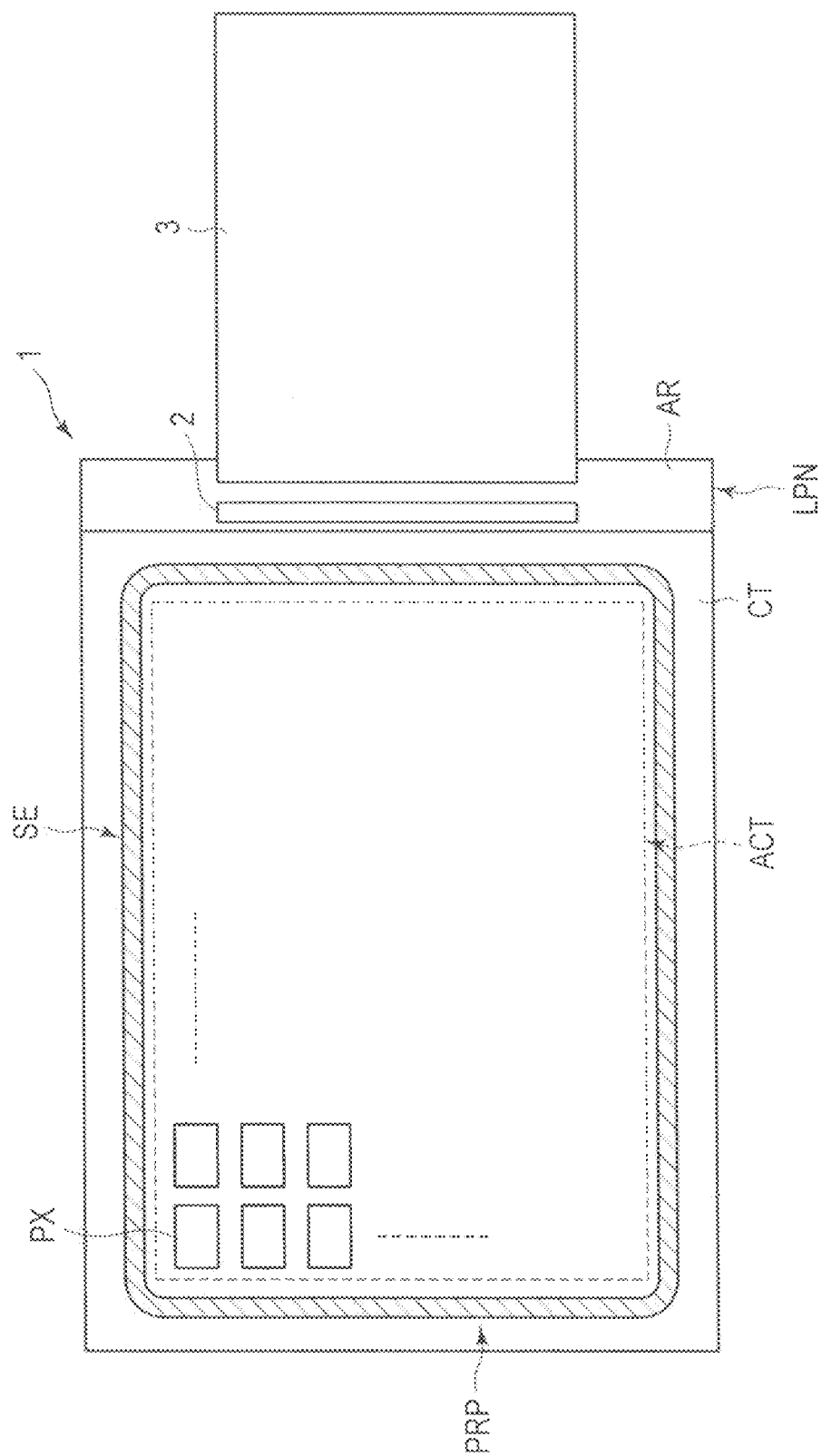
FIG. 1 is a plan view which schematically shows the structure of a liquid crystal display device according to an embodiment.

In general, according to one embodiment, a liquid crystal display device comprises a first substrate including a first insulative substrate, a common electrode disposed on an inner surface side of the first insulative substrate, an insulation film covering the common electrode, a pixel electrode which is disposed above the insulation film, opposed to the common electrode and provided with a slit, and a first alignment film covering the pixel electrode; a second substrate including a second insulative substrate and a second alignment film disposed on an inner surface side of the second insulative substrate, the inner surface side of the second insulative substrate being opposed to the pixel electrode; a liquid crystal layer held between the first substrate and the second substrate; a first polarizer disposed on an outer surface side of the first insulative substrate; a second polarizer disposed on an outer surface side of the second insulative substrate; and a first retardation plate and a second retardation plate, which are stacked between the second insulative substrate and the second polarizer, wherein, with respect to the first retardation plate and the second retardation plate, when refractive indices in two directions, which are perpendicular to each other in a plane of each of the first retardation plate and the second retardation plate, are nx and ny, respectively, a refractive index in a thickness direction is nz, a thickness is d, and a retardation in the thickness direction, which is defined by $((nx+ny)/2-nz)*d$, is Rth, the first retardation plate has a negative first retardation Rth1, the second retardation plate has a positive second retardation Rth2, a sum of the first retardation Rth1 and the second retardation Rth2 is −40 nm±20 nm with respect to light with a wavelength of 550 nm, and a contribution degree of the second retardation Rth2, which is defined by $|Rth2|*100/(|Rth1|+|Rth2|)$, is 40%±3%.

According to another embodiment, a liquid crystal display device comprises a first substrate including a first insulative substrate, a common electrode disposed on an inner surface side of the first insulative substrate, an insulation film covering the common electrode, a pixel electrode which is disposed above the insulation film, opposed to the common electrode and provided with a slit, and a first alignment film covering the pixel electrode; a second substrate including a second insulative substrate and a second alignment film disposed on an inner surface side of the second insulative substrate, the inner surface side of the second insulative substrate being opposed to the pixel electrode; a liquid crystal layer held between the first substrate and the second substrate; a first polarizer disposed on an outer surface side of the first insulative substrate; a second polarizer disposed on an outer surface side of the second insulative substrate; and a first retardation plate and a second retardation plate, which are stacked between the second insulative substrate and the second polarizer, wherein, with respect to the first retardation plate and the second retardation plate, when refractive indices in two directions, which are perpendicular to each other in a plane of each of the first retardation plate and the second retardation plate, are nx and ny, respectively, a refractive index in a thickness direction is nz, and a thickness is d, the first retardation plate has one of a refractive index anisotropy of nx=ny<nz and a refractive index anisotropy of nz>nx>ny, and the second retardation plate has a refractive index anisotropy of nx>ny>nz, the first retardation plate has a first retardation Rth1 and the second retardation plate has a second retardation Rth2 when a retardation in the thickness direction, which is defined by ((nx+ny)/2−nz)*d, is Rth, and a contribution degree of the second retardation Rth2, which is defined by |Rth2|*100/(|Rth1|+|Rth2|), is 40%±3%.

According to another embodiment, a liquid crystal display device comprises a first substrate including a first insulative substrate, a common electrode disposed on an inner surface side of the first insulative substrate, an insulation film covering the common electrode, a pixel electrode which is disposed above the insulation film, opposed to the common electrode and provided with a slit, and a first alignment film covering the pixel electrode; a second substrate including a second insulative substrate and a second alignment film disposed on an inner surface side of the second insulative substrate, the inner surface side of the second insulative substrate being opposed to the pixel electrode; a liquid crystal layer held between the first substrate and the second substrate; a first polarizer disposed on an outer surface side of the first insulative substrate; a first retardation plate disposed on an outer surface of the second insulative substrate; a second retardation plate stacked on the first retardation plate; and a second polarizer stacked on the second retardation plate, wherein, with respect to the first retardation plate and the second retardation plate, when refractive indices in two directions, which are perpendicular to each other in a plane of each of the first retardation plate and the second retardation plate, are nx and ny, respectively, a refractive index in a thickness direction is nz, and a thickness is d, a sum of in-plane retardations Re, which are defined by (nx−ny)*d, is 115 nm±15 nm with respect to light with a wavelength of 550 nm, and a sum of retardations Rth in the thickness direction, which are defined by ((nx+ny)/2−nz)*d, is −40 nm±20 nm with respect to light with a wavelength of 550 nm.

Embodiments will now be described in detail with reference to the accompanying drawings. In the drawings, structural elements having the same or similar functions are denoted by like reference numerals, and an overlapping description is omitted.

FIG. 1 is a plan view which schematically shows the structure of a liquid crystal display device 1 according to an embodiment.

Specifically, the liquid crystal display device 1 includes an active-matrix-type liquid crystal display panel LPN. In the example illustrated, the liquid crystal display device 1 includes a driving IC chip 2 and a flexible wiring board 3 as signal sources which supply necessary signals for displaying an image on the liquid crystal display panel LPN.

The liquid crystal display panel LPN includes an array substrate AR as a first substrate, a counter-substrate CT as a second substrate which is disposed to be opposed to the array substrate AR, and a liquid crystal layer which is disposed between the array substrate AR and the counter-substrate CT. The array substrate AR and the counter-substrate CT are attached by a sealant SE. The liquid crystal layer is held in an inside surrounded by the sealant SE in a cell gap which is created between the array substrate AR and the counter-substrate CT. The sealant SE is formed, for example, in a substantially rectangular frame shape between the array substrate AR and the counter-substrate CT, and forms a closed loop.

The liquid crystal display panel LPN includes an active area ACT, which displays an image, in the inside surrounded by the sealant SE. The active area ACT has a substantially rectangular shape and is composed of a plurality of pixels PX which are arrayed in a matrix of m×n (m and n are positive integers). The driving IC chip 2 and flexible wiring board 3 are mounted on the array substrate AR in a peripheral area PRP on the outside of the active area ACT.

Figure 2:
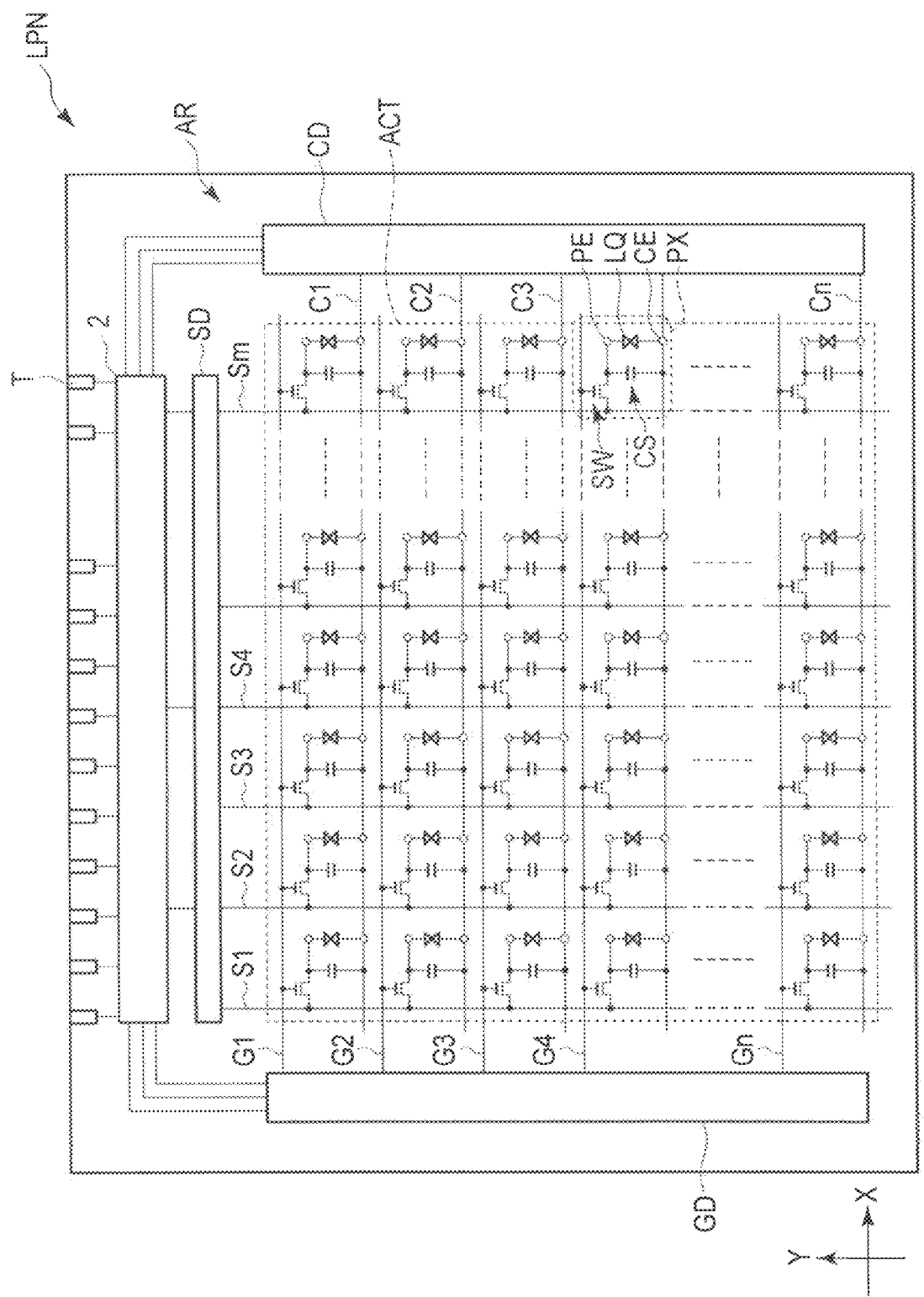
FIG. 2 is a view which schematically shows the structure and an equivalent circuit of a liquid crystal display panel shown in FIG. 1.

FIG. 2 is a view which schematically shows the structure and an equivalent circuit of the liquid crystal display panel LPN shown in FIG. 1. A description is given of the structure in which the array substrate AR of the liquid crystal display panel LPN includes a pixel electrode PE and a common electrode CE, and a fringe field switching (FFS) mode is applied to switch liquid crystal molecules which constitute a liquid crystal layer LQ by mainly making use of a transverse electric field (i.e. an electric field substantially parallel to a major surface of the substrate) which is produced between the pixel electrode PE and common electrode CE.

The array substrate AR includes, in the active area ACT, an n-number of gate lines G (G1 to Gn), an n-number of capacitance lines C (C1 to Cn), an m-number of source lines S (S1 to Sm), an (m×n) number of switching elements SW which are formed in respective pixels PX, an (m×n) number of pixels PE which are formed in the respective pixels PX, and a common electrode CE which is formed common to the plural pixels PX.

The gate lines G and capacitance lines C extend in a first direction X. The source lines S extend in a second direction Y which is substantially perpendicular to the first direction X. The switching elements SW are electrically connected to the gate lines G and source lines S. The pixel electrode PE is electrically connected to the switching element SW of each pixel PX. The common electrode CE is a part of the capacitance line C, and is opposed to the pixel electrode PE in each pixel PX. A storage capacitance CS is formed, for example, between the capacitance line C and pixel electrode PE. The liquid crystal layer LQ is interposed between the pixel electrode PE and the common electrode CE.

Each of the gate lines G is led out of the active area ACT and is connected to a first driving circuit GD. Each of the source lines S is led out of the active area ACT and is connected to a second driving circuit SD. Each of the capacitance lines C is led out of the active area ACT and is connected to a third driving circuit CD. The first driving circuit GD, second driving circuit SD and third driving circuit CD are formed on the array substrate AR and are connected to the driving IC chip 2.

In the example illustrated, the driving IC chip 2 is mounted on the array substrate AR on the outside of the active area ACT. The depiction of the flexible wiring board is omitted, and terminals T for connection to the flexible wiring board are formed on the array substrate AR. These terminals T are connected to the driving IC chip 2 via various wiring lines.

Figure 3:
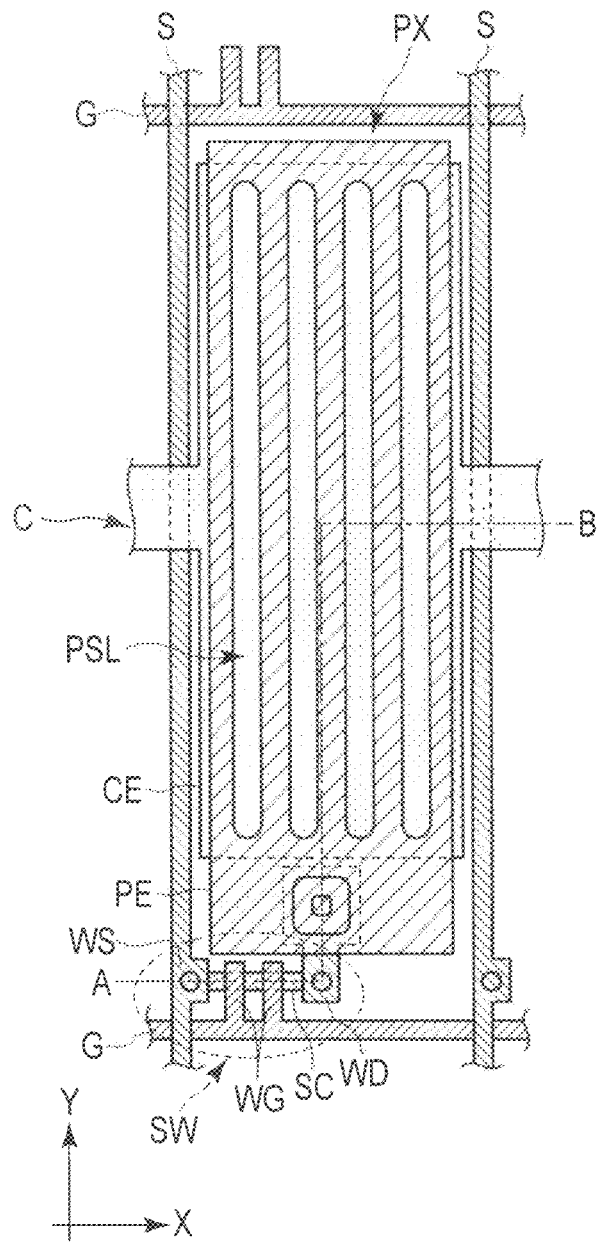
FIG. 3 is a schematic plan view showing an example of the structure of a pixel in an array substrate shown in FIG. 2, as viewed from a counter-substrate side.

FIG. 3 is a schematic plan view showing an example of the structure of the pixel PX in the array substrate AR shown in FIG. 2, as viewed from the counter-substrate CT side.

The gate lines G extend in a substantially linear shape along the first direction X. The source lines S extend in a substantially linear shape along the second direction Y. The switching element SW is disposed at an intersection between the gate line G and source line S. The switching element SW is composed of, for example, a thin-film transistor (TFT). The switching element SW includes a semiconductor layer SC. The semiconductor layer SC can be formed of, for example, polysilicon or amorphous silicon. In this example, the semiconductor layer SC is formed of polysilicon.

A gate electrode WG of the switching element SW is located immediately above the semiconductor layer SC, and is electrically connected to the gate line G (in the example illustrated, the gate electrode WG is formed integral with the gate line G). A source electrode WS of the switching element SW is electrically connected to the source line S (in the example illustrated, the source electrode WS is formed integral with the source line S). A drain electrode WD of the switching element SW is electrically connected to the pixel electrode PE.

The capacitance line C extends in the first direction X. The capacitance line C includes the common electrode CE which is formed in a manner to correspond to the respective pixels PX, and extends over a part of the source line S. The pixel electrode PE is disposed above the common electrode CE. The pixel electrode PE is formed in an island shape corresponding to the pixel shape in the pixel PX, for example, in a substantially rectangular shape.

Slit PSL are formed in the pixel electrode PE. In the example illustrated, the slits PSL extend in a linear shape in the second direction Y. Specifically, the direction of extension of the slits PSL is substantially parallel to the direction of extension of the source lines S. The slits PSL are formed above the common electrode CE. By such slit shapes, single domains are formed in the respective pixels PX.

Figure 4:
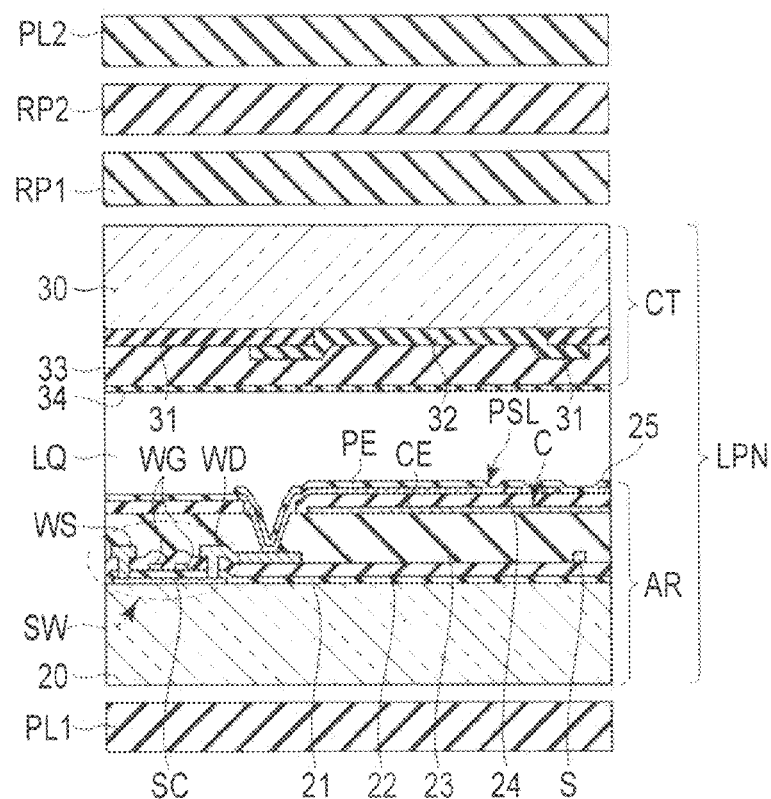
FIG. 4 is a view which schematically shows a cross-sectional structure of the liquid crystal display panel, illustrating a cross section of the pixel along line A-B in FIG. 3.

FIG. 4 is a view which schematically shows a cross-sectional structure of the liquid crystal display panel LPN, illustrating a cross section of the pixel PX along line A-B in FIG. 3.

Specifically, the array substrate AR is formed by using a first insulative substrate 20 having light transmissivity, such as a glass substrate. The array substrate AR includes the switching element SW, common electrode CE, pixel electrode PE and first alignment film 25 on an inner surface of the first insulative substrate 20 (i.e. the surface opposed to the counter-substrate CT). The switching element SW shown in FIG. 4 is a top-gate-type thin-film transistor. The semiconductor layer SC is formed on the first insulative substrate 20. The semiconductor layer SC is covered with a gate insulation film 21. In addition, the gate insulation film 21 is also formed on the first insulative substrate 20. In the meantime, an undercoat layer may be disposed as an insulation film between the first insulative substrate 20 and the semiconductor layer SC.

The gate electrode WG of the switching element SW is formed on the gate insulation film 21 and is located immediately above the semiconductor layer SC. The gate electrode WG is covered with a first interlayer insulation film 22. The first interlayer insulation film 22 is also formed on the gate insulation film 21. The gate insulation film 21 and first interlayer insulation film 22 are formed of an inorganic material such as silicon nitride (SiN).

The source electrode WS and drain electrode WD of the switching element SW are formed on the first interlayer insulation film 22. The source electrode WS and drain electrode WD are put in contact with the semiconductor layer SC via contact holes which penetrate the gate insulation film 21 and first interlayer insulation film 22. In addition, the source line S is formed on the first interlayer insulation film 22. The gate electrode WG, source electrode WS and drain electrode WD are formed of an electrically conductive material such as molybdenum, aluminum, tungsten or titanium.

The source electrode WS and drain electrode WD are covered with a second interlayer insulation film 23. In addition, the second interlayer insulation film 23 is formed on the first interlayer insulation film 22. The capacitance line C including the common electrode CE is formed on the second interlayer insulation film 23, and extends over the source line S. The common electrode CE and capacitance line C are covered with a third interlayer insulation film 24. The third interlayer insulation film 24 is also formed on the second interlayer insulation film 23.

The pixel electrode PE is formed on the third interlayer insulation film 24. The pixel electrode PE is connected to the drain electrode WD via a contact hole which penetrates the second interlayer insulation film 23 and third interlayer insulation film 24. The slit PSL, which is opposed to the common electrode CE, is formed in the pixel electrode PE. The pixel electrode PE is opposed to the common electrode CE via the second interlayer insulation film 24.

The common electrode CE, capacitance line C and pixel electrode PE are formed of a transparent, electrically conductive material, such as an indium tin oxide (ITO) or an indium zinc oxide (IZO). The pixel electrode PE and second interlayer insulation film 24 are covered with a first alignment film 25.

Specifically, the first alignment film 25 is disposed on that surface of the array substrate AR, which is in contact with the liquid crystal layer LQ.

On the other hand, the counter-substrate CT is formed by using a second insulative substrate 30 having light transmissivity, such as a glass substrate. The counter-substrate CT includes a black matrix 31, a color filter 32, an overcoat layer 33 and a second alignment film 34 on the inner surface of the second insulative substrate 30 (i.e. the surface opposed to the array substrate AR).

The black matrix 31 partitions the pixels PX. The black matrix 31 is formed on the second insulative substrate 30. To be more specific, in the active area ACT, the black matrix 31 is formed to be positioned immediately above the wiring portions such as the gate line G, source line S and switching element SW, which are provided on the array substrate AR. The black matrix 31 is formed in a lattice shape or in stripes. The black matrix 31 is formed of a light-blocking metallic material such as a black-colored resin material or chromium (Cr).

The color filter 32 is formed in each pixel PX. The color filter 32 is formed on the second insulative substrate 30. To be more specific, in the active area ACT, the color filter 32 includes a red color filter which is disposed to correspond to a red pixel, a blue color filter which is disposed to correspond to a blue pixel, and a green color filter which is disposed to correspond to a green pixel. A part of the color filter 32 is laid over the black matrix 31. The red color filter, blue color filter and green color filter are formed of, for example, resin materials which are colored in the respective colors.

In the above-described liquid crystal mode which makes use of the transverse electric field, it is desirable that the surface of the counter-substrate CT, which is in contact with the liquid crystal layer LQ, be planar. In the example illustrated, the overcoat layer 33 covers the black matrix 31 and color filter 32 and planarizes the asperities on the surfaces thereof. The overcoat layer 33 is formed of, for example, a transparent resin material.

The overcoat layer 33 is covered with the second alignment film 34. Specifically, the second alignment film 34 is disposed on that surface of the counter-substrate CT, which is in contact with the liquid crystal layer LQ. The first alignment film 25 and second alignment film 34 are formed of, for example, polyimide.

The above-described array substrate AR and counter-substrate CT are disposed such that the first alignment film 25 and second alignment film 34 face each other. In this case, spacers (e.g. columnar spacers which are formed of resin material so as to be integral with the array substrate AR), which are not shown, are disposed between the array substrate AR and counter-substrate CT. Thereby, a predetermined cell gap is created between the array substrate AR and the counter-substrate CT. The array substrate AR and counter-substrate CT are attached by a sealant SE in the state in which the predetermined cell gap is created.

The liquid crystal layer LQ is formed of a liquid crystal composition which is sealed in the cell gap that is created between the first alignment film 25 of the array substrate AR and the second alignment film 34 of the counter-substrate CT.

A first polarizer PL1 is disposed on the side of the outer surface of the array substrate AR, that is, on the outer surface of the first insulative substrate 20. The first polarizer PL1 is fixed to the outer surface of the first insulative substrate 20 by means of, e.g. adhesion.

A second polarizer PL2 is disposed on the side of the other outer surface of the counter-substrate CT, that is, the outer surface of the second insulative substrate 30. A first retardation plate RP1 and a second retardation plate RP2 are stacked between the second insulative substrate 30 and the second polarizer PL2. In the example illustrated, the first retardation plate RP1 is disposed on the outer surface of the second insulative substrate 30, the second retardation plate RP2 is stacked on the first retardation plate RP1, and the second polarizer PL2 is stacked on the second retardation plate RP2.

The first retardation plate RP1, second retardation plate RP2 and second polarizer PL2 are formed as one set by means of, e.g. adhesion. The set of the first retardation plate RP1, second retardation plate RP2 and second polarizer PL2 is fixed such that the first retardation plate RP1, for example, is adhered to the outer surface of the second insulative substrate 30.

Figure 5:
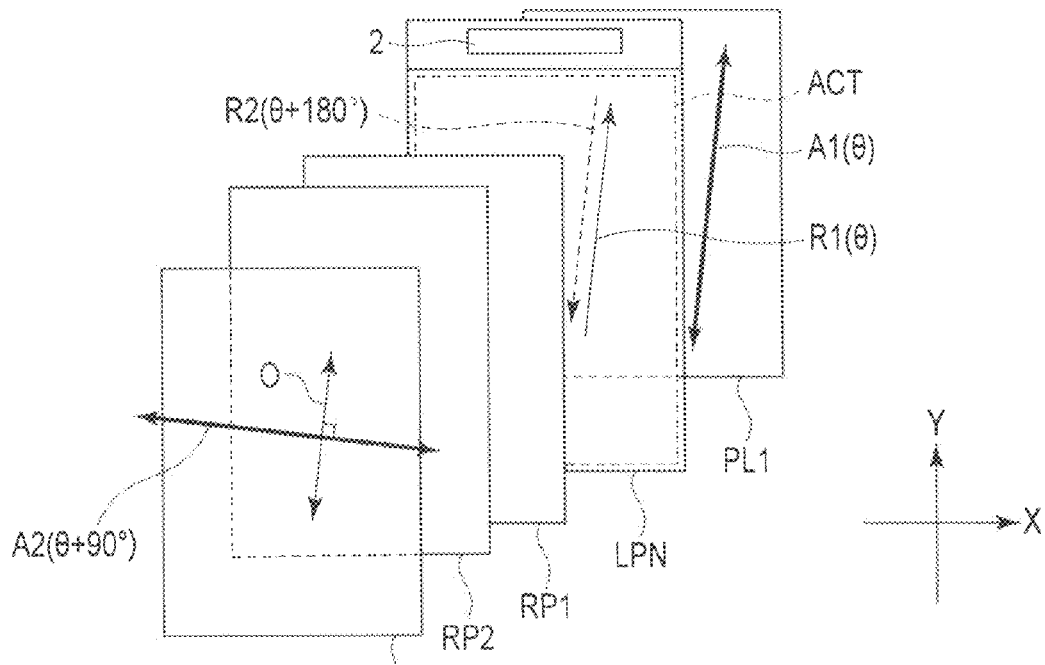
FIG. 5 is a view for explaining the relationship between the angles of axes of various optical elements which are applied in the embodiment, FIG. 5 being a top view at a time when the liquid crystal display panel is observed from the counter-substrate side.

FIG. 5 is a view for explaining the relationship between the angles of axes of various optical elements which are applied in the embodiment, FIG. 5 being a top view at a time when the liquid crystal display panel LPN is observed from the counter-substrate CT side, that is, from above.

In the liquid crystal display panel LPN, the slits PSL, which are formed in each pixel electrode PE, extend in the second direction Y, as described above. The first alignment film 25 of the array substrate AR is subjected to alignment treatment in a θ direction. Specifically, a first alignment treatment direction R1 of the first alignment film 25 is the θ direction. The direction of extension of the slit PSL (the second direction Y) is a direction slightly inclined counterclockwise relative to the θ direction. In this example, the direction of the slit PSL corresponds to a direction which is displaced counterclockwise by 5° to 10° relative to the θ direction. In other words, the θ direction is a direction which is displaced clockwise by 5° to 10° from the second direction Y.

The second alignment film 34 of the counter-substrate CT is subjected to alignment treatment in a (θ+180°) direction. Specifically, a second alignment treatment direction R2 of the second alignment film 34 is parallel to, and opposite to, the first alignment treatment direction R1 of the first alignment film 25. The first alignment treatment direction R1 of the first alignment film 25 and the second alignment treatment direction R2 of the second alignment film 34 are the directions in which rubbing treatment and optical alignment treatment are performed.

The first polarizer PL1 has a first absorption axis A1 which is substantially parallel to the first alignment treatment direction R1 of the first alignment film 25. Specifically, the first absorption axis A1 is parallel to the θ direction. In some cases, the first absorption axis is referred to as "first polarization axis". The second polarizer PL2 has a second absorption axis A2 which is substantially perpendicular to the first alignment treatment direction R1 or the first absorption axis A1. Specifically, the second absorption axis A2 is parallel to a (θ+90°) direction. In some cases, the second absorption axis is referred to as "second polarization axis".

The first retardation plate RP1 and second retardation plate RP2 are disposed over the entirety of the active area ACT. The details of the first retardation plate RP1 and second retardation plate RP2 will be described later.

Figure 6:
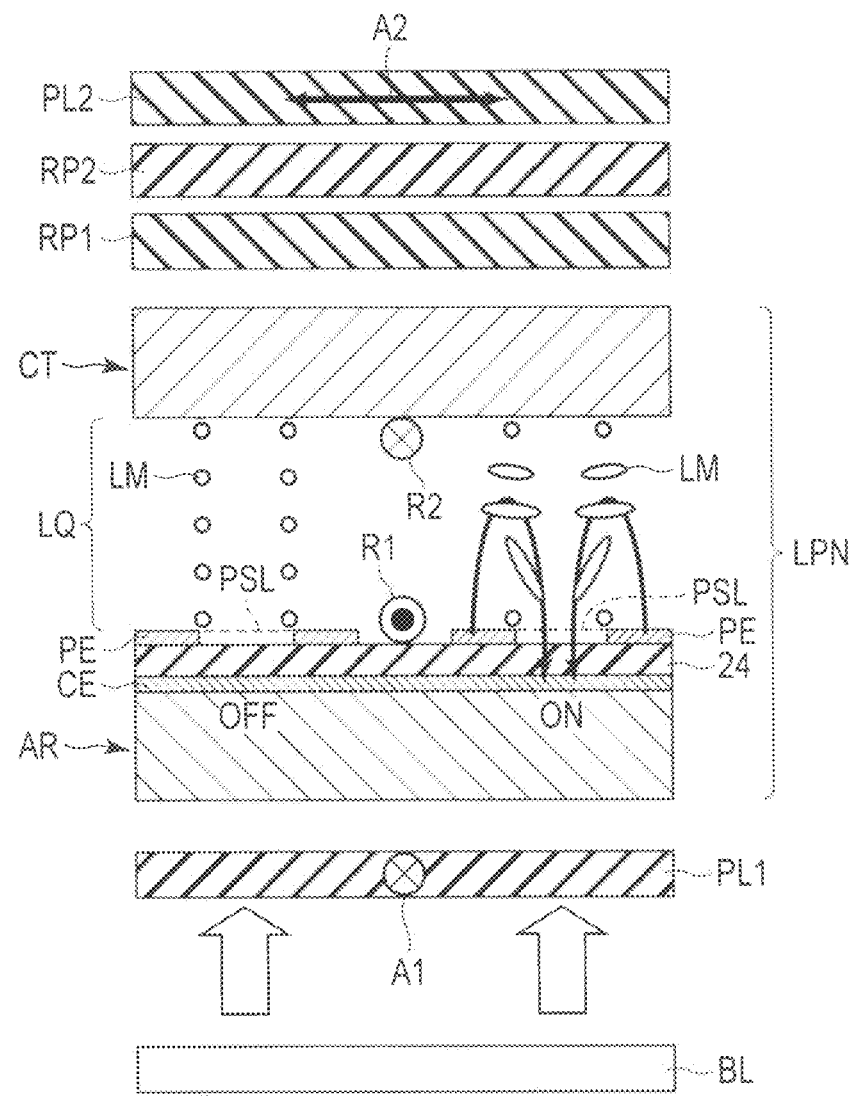
FIG. 6 is a view for explaining the principle of operation in the liquid crystal display device of the embodiment.

FIG. 6 is a view for explaining the principle of operation in the liquid crystal display device of the embodiment. A description is given with reference to the cross-section of the liquid crystal display panel LPN in the (θ+90°) direction that is parallel to the second absorption axis A2. Only the structure that is necessary for the description is illustrated.

A left part of FIG. 6 illustrates an OFF state in which no electric field is produced between the pixel electrode PE and the common electrode CE in the liquid crystal display device of the present embodiment. A right part of FIG. 6 illustrates an ON state in which an electric field (fringe electric field) is produced between the pixel electrode PE and the common electrode CE via the slit PSL. The liquid crystal display device shown in FIG. 6 operates in a linear polarization mode.

In the OFF state, the axis of alignment of liquid crystal molecules LM, which are homogenously aligned in the liquid crystal layer LQ in the first alignment treatment direction R1 of the first alignment film and the second alignment treatment direction R2 of the second alignment film, is parallel to the first absorption axis A1 of the first polarizer PL1 and is perpendicular to the second absorption axis A2 of the second polarizer PL2. In the OFF state, linearly polarized light, which is emitted from a backlight BL and passes through the first polarizer PL1, travels through the liquid crystal display panel LPN and is then absorbed in the second polarizer PL2. Thus, black display is effected in the OFF state.

On the other hand, in the ON state, some of the liquid crystal molecules LM are affected by the fringe electric field and the alignment state thereof changes. At this time, the axis of alignment of liquid crystal molecules LM is displaced from the first absorption axis A1 of the first polarizer PL1 and the second absorption axis A2 of the second polarizer PL2. In the ON state, the liquid crystal layer LQ has a retardation $\Delta n \cdot d$ which corresponds to a ½ wavelength ($\Delta n$ is the refractive index anisotropy of the liquid crystal layer LQ, and d is the thickness of the liquid crystal layer LQ). Thus, linearly polarized light, which passes through the first polarizer PL1, changes its polarization state due to the effect of the retardation of the liquid crystal layer LQ while traveling through the liquid crystal display panel LPN, and the light emerging from the liquid crystal display panel LPN passes through the second polarizer PL2. Accordingly, white display is effected. Thereby, a normally black mode is realized.

As described above, in the ON state, the liquid crystal layer LQ has a retardation Δn·d which corresponds to a ½ wavelength of the wavelength λ of transmissive light. Meanwhile, in the OFF state, the liquid crystal layer LQ has a retardation Δn·d which is higher than the ½ wavelength, and has a retardation Δn·d of 300 nm to 350 nm, relative to light with a wavelength of 550 nm.

In each of the OFF state and ON state, the light, which has passed through the liquid crystal display panel LPN, is affected by a proper retardation when the light passes through the first retardation plate RP1 and second retardation plate RP2. One of the retardation plates mainly has such a refractive index anisotropy that the refractive index in the thickness direction is relatively high, with respect to the liquid crystal molecules LM which are homogenously aligned substantially in parallel to the major surface of the substrate. Thereby, this one retardation plate executes optical compensation so as to impart isotropic optical characteristics to the liquid crystal molecules LM, regardless of the viewing angle. The other retardation plate executes optical compensation so that the first polarization axis and second polarization axis, which are in a positional relationship of crossed Nicols, may keep the same positional relationship regardless of the viewing angle.

Thereby, the light, which has passed through the liquid crystal display panel LPN, is optically compensated so as to exhibit equal optical characteristics in a frontal direction which is parallel to the normal line of the liquid crystal display panel LPN or in an oblique direction which is inclined to the normal line. Hence, the range of the viewing angle, at which observation with an equal contrast ratio (CR) is possible, can be increased, and the range of the viewing angle, at which no gray level inversion is observed, can be increased.

Next, a description is given of the first retardation plate RP1 and second retardation plate RP2, which are applicable to the present embodiment.

In the present embodiment, when various characteristics of the retardation plates are discussed, the refractive indices in two directions, which are perpendicular to each other in the plane of the retardation plate, are nx and ny, the refractive index in the thickness direction is nz, and the thickness of each retardation plate is d. In this case, nx corresponds to the refractive index in the slow axis direction in the plane, and ny corresponds to the refractive index in the fast axis direction in the plane.

In the retardation plate, the retardation Re in the plane is defined by the following equation:

$$Re=(nx-ny)*d.$$

The first retardation plate RP1 has a first retardation Re1, and the second retardation plate RP2 has a second retardation Re2. There may be a case, however, in which the retardation Re1 and retardation Re2 are zero. In the present embodiment, it is desirable that the sum of the first retardation Re1 of the first retardation plate RP1 and the second retardation Re2 of the second retardation RP2 (Re(sum)=Re1+Re2) be set within the range of 115 nm±15 nm.

In the retardation plate, the retardation Rth in the thickness direction is defined by the following equation:

$$Rth=((nx+ny)/2-nz)*d.$$

The first retardation plate RP1 has a first retardation Rth1, and the second retardation plate RP2 has a second retardation Rth2. In the present embodiment, it is desirable that the sum of the first retardation Rth1 of the first retardation plate RP1 and the second retardation Rth2 of the second retardation RP2 (Rth(sum)=Rth1+Rth2) be set within the range of −40 nm±20 nm.

The values of both retardations Re and Rth described here are values with respect to light with a wavelength of 550 nm.

Either the first retardation plate RP1 or the second retardation plate RP2 has a refractive index anisotropy of nx>ny>nz. The optical axis in the plane of the retardation plate having this refractive index anisotropy is substantially perpendicular to the second absorption axis A2 of the second polarizer PL2, or is substantially parallel to the first alignment treatment direction R1 and second alignment treatment direction R2.

Next, concrete examples of the above are described.

Figures 7, 8:
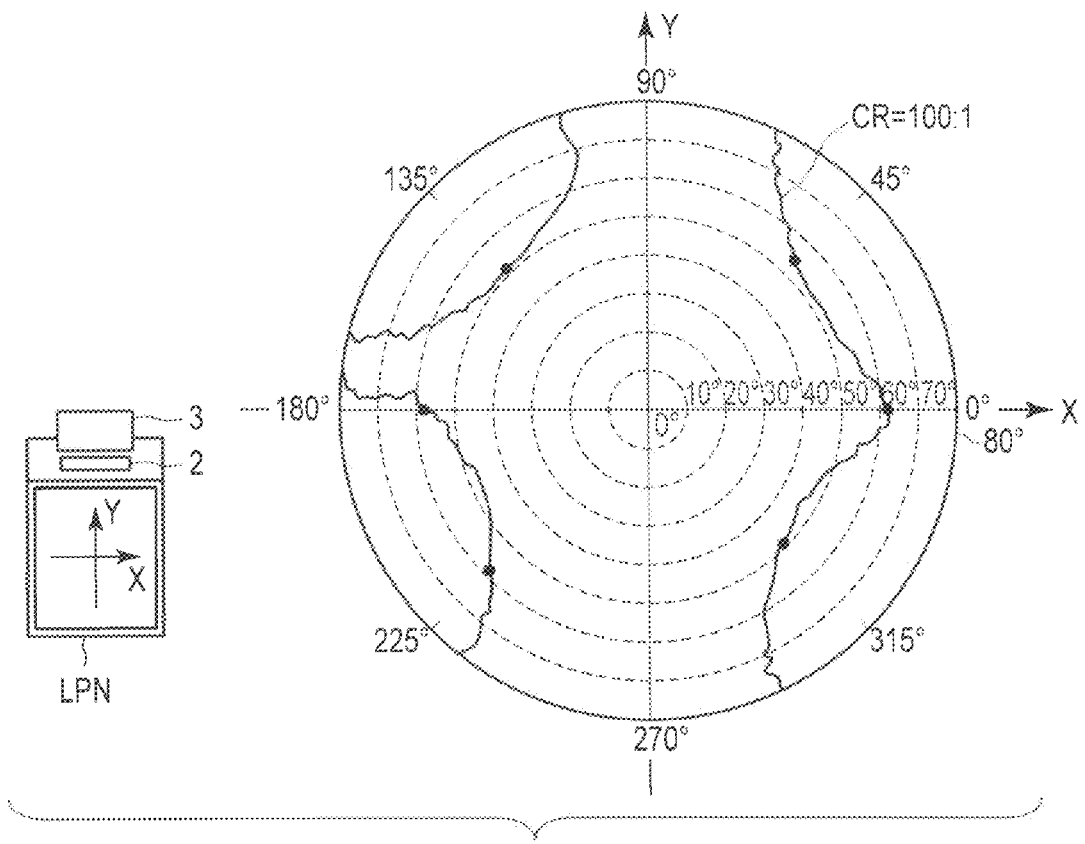
FIG. 7 is a view for explaining the characteristics of a first retardation plate and a second retardation plate which are applicable in the embodiment.
FIG. 8 is a view showing a simulation result of the viewing angle characteristics of the contrast ratio in a case where the first retardation plate and second retardation plate shown in FIG. 7 are applied to the liquid crystal display device of the embodiment.

FIG. 7 is a view for explaining the characteristics of the first retardation plate RP1 and second retardation plate RP2 which are applicable in the embodiment.

The first retardation plate RP1 has a refractive index anisotropy of nx=ny<nz. The first retardation plate RP1 is formed of, for example, a liquid crystal polymer. In the first retardation plate RP1, the value of the first retardation Re1 is 0 nm, and the value of the first retardation Rth1 is −150 nm.

The second retardation plate RP2 has a refractive index anisotropy of nx>ny>nz. The second retardation plate RP2 is formed of a material different from the material of the first retardation plate RP1, for example, cycloolefin polymer. In the second retardation plate RP2, the value of the second retardation Re2 is 115 nm, and the value of the second retardation Rth2 is 103.5 nm. The optical axis O in the plane of the second retardation plate RP2 is substantially perpendicular to the second absorption axis A2 of the second polarizer plate PL2 (see FIG. 5).

Accordingly, as regards the first retardation plate RP1 and second retardation plate RP2, the sum Re(sum) of the retardations Re is 115 nm, and the sum Rth(sum) of the retardations Rth is −46.5 nm. One aspect of the present embodiment is that the sum Re(sum) of the retardations Re in the first retardation plate RP1 and second retardation plate RP2 is in the range of 100 nm to 130 nm, or that the sum Rth(sum) of the retardations Rth is in the range of −60 nm to −20 nm.

Meanwhile, the first retardation plate RP1 and second retardation plate RP2 are formed of different materials. When a desired retardation Re or retardation Rth is to be obtained by combining them, it is necessary to consider the wavelength dispersion characteristics of the respective retardation plates. Specifically, the first retardation plate RP1 has a wavelength dispersion which is different from the wavelength dispersion of the second retardation plate RP2. In addition, as regards an Nz coefficient which is defined by Nz=(nx−nz)/(nx−ny), the first retardation plate RP1 has an Nz coefficient which is different from the Nz coefficient of the second retardation plate RP2. Thus, even in the case where the desired retardation is to be obtained, it is not sufficient that the sum of the retardations merely falls within the above-described range. It is necessary to consider the degree of contribution as an index which indicates how the retardation of one of the retardation plates contributes to the sum of the retardations of the two retardation plates. In particular, the value of the retardation Rth of one of the retardation plates is a negative value, and the value of the retardation Rth of the other retardation plate is a positive value. In this description, the degree of contribution of the retardation plate having a positive retardation Rth, or the retardation plate having a refractive index anisotropy of nx>ny>nz, is defined. The second retardation plate RP2 in the example shown in FIG. 7 corresponds to the retardation plate having a positive second retardation Rth2 (or the retardation plate having a refractive index anisotropy of nx>ny>nz). The contribution degree CNT (%) of the second retardation Rth2 is defined by the following equation:

CNT2(%)=|Rth2|*100/(|Rth1|+|Rth2|).

Similarly, the contribution degree CNT (%) of the first retardation Rth1 is defined by the following equation:

CNT1(%)=|Rth1|*100/(|Rth1|+|Rth2|).

Another aspect of the present embodiment is that the contribution degree CNT2 of the second retardation Rth2 is set in the range of 40%±3%. In the example shown in FIG. 7, the contribution degree CNT2 of the second retardation Rth2 is 40.8%. In other words, the contribution degree CNT1 of the first retardation Rth1 should desirably be set in the range of 60%±3%, and is 59.2% in the above example.

FIG. 8 is a view showing a simulation result of the viewing angle characteristics of the contrast ratio in a case where the first retardation plate RP1 and second retardation plate RP2 shown in FIG. 7 are applied to the liquid crystal display device of the present embodiment.

In FIG. 8, the center corresponds to a direction parallel to the normal line of the liquid crystal display panel LPN. Concentric circles about the normal line correspond to positions with tilt angles (viewing angles) of 10°, 20°, 30°, 40°, 50°, 60°, 70° and 80° to the normal line. In addition, in FIG. 8, a 0° azimuth direction corresponds to a positive side (+) in the X direction in which the above-described gate lines extend, and a 180° azimuth direction corresponds to a negative side (−) in the X direction. A 90° azimuth direction corresponds to a positive side (+) in the Y direction in which the above-described source lines extend, and a 270° azimuth direction corresponds to a negative side (−) in the Y direction. Referring to similar Figures, a description will be given later of simulation results of the viewing angle characteristics of the contrast ratio and the viewing angle characteristics of the gray level inversion.

As shown in FIG. 8, according to the present embodiment, it was confirmed that the contrast ratio (CR) is 10:1 or more in all azimuth directions. As regards regions where the contrast ratio is 100:1 or more, it was confirmed that the following ranges of viewing angles can be obtained: about 60° at 0° azimuth, about 55° at 45° azimuth, about 80° at 90° azimuth, about 50° at 135° azimuth, about 60° at 180° azimuth, about 60° at 225° azimuth, about 80° at 270° azimuth, and about 50° at 315° azimuth.

Figure 9:
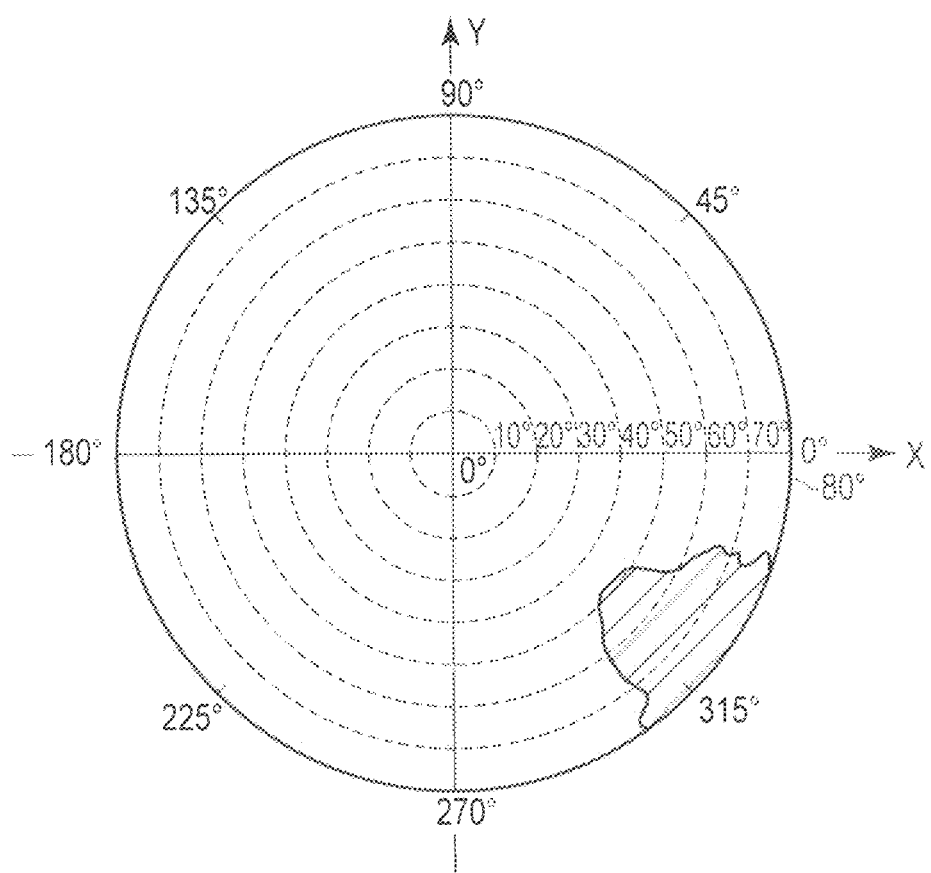
FIG. 9 is a view showing a simulation result of the viewing angle characteristics of the gray level inversion in a case where the first retardation plate and second retardation plate shown in FIG. 7 are applied to the liquid crystal display device of the embodiment.

FIG. 9 is a view showing a simulation result of the viewing angle characteristics of the gray level inversion in a case where the first retardation plate RP1 and second retardation plate RP2 shown in FIG. 7 are applied to the liquid crystal display device of the embodiment. A part where a gray level inversion occurred corresponds to a hatched part in FIG. 9.

As shown in FIG. 9, according to the present embodiment, it was confirmed that no gray level inversion occurs in almost all directions, except the 315° azimuth direction. It was also confirmed that even in the 315° azimuth direction, no gray level inversion occurs in the range of the viewing angle of about 50° or less.

FIG. 10 is a view for explaining the characteristics of first retardation plates RP1 and second retardation plates RP2 which are applicable to Modifications 1, 2 and 3 of the embodiment, Comparative Example 1 in which neither the first retardation plate nor second retardation plate is applied, and the characteristics of a first retardation plate RP1 and a second retardation plate RP2 of Comparative Example 2.

In Modification 1 of the embodiment, the first retardation plate RP1 has a refractive index anisotropy of nx=ny<nz. This first retardation plate RP1 is formed of, for example, a liquid crystal polymer. In the first retardation plate RP1, the value of the first retardation Re1 is 0 nm, and the value of the first retardation Rth1 is −150 nm. The second retardation plate RP2 has a refractive index anisotropy of nx>ny>nz. This second retardation plate RP2 is formed of, for example, cycloolefin polymer. In the second retardation plate RP2, the value of the second retardation Re2 is 100 nm, and the value of the second retardation Rth2 is 90 nm. The optical axis O in the plane of the second retardation plate RP2 is substantially perpendicular to the second absorption axis A2 of the second polarizer PL2. Thus, as regards the first retardation plate RP1 and second retardation plate RP2, the sum Re(sum) of the retardations Re is 100 nm, and the sum Rth(sum) of the retardations Rth is −60 nm. In addition, the contribution degree CNT2 of the second retardation Rth2 is 37.5%.

In Modification 2 of the embodiment, the first retardation plate RP1 has a refractive index anisotropy of nz>nx>ny. This first retardation plate RP1 is formed of, for example, maleimide. In the first retardation plate RP1, the value of the first retardation Re1 is 19.8 nm, and the value of the first retardation Rth1 is −93 nm. The second retardation plate RP2 has a refractive index anisotropy of nx>ny>nz. This second retardation plate RP2 is formed of, for example, cycloolefin polymer. In the second retardation plate RP2, the value of the second retardation Re2 is 101.5 nm, and the value of the second retardation Rth2 is 69.3 nm. The optical axis O in the plane of the second retardation plate RP2 is substantially perpendicular to the second absorption axis A2 of the second polarizer PL2. Thus, as regards the first retardation plate RP1 and second retardation plate RP2, the sum Re(sum) of the retardations Re is 121.3 nm, and the sum Rth(sum) of the retardations Rth is −23.7 nm. In addition, the contribution degree CNT2 of the second retardation Rth2 is 42.7%.

In Modification 3 of the embodiment, the first retardation plate RP1 has a refractive index anisotropy of nx>ny>nz. This first retardation plate RP1 is formed of, for example, cycloolefin polymer. In the first retardation plate RP1, the value of the first retardation Re1 is 76.3 nm, and the value of the first retardation Rth1 is 66 nm. The optical axis O in the plane of the first retardation plate RP1 is substantially perpendicular to the second absorption axis A2 of the second polarizer PL2. The second retardation plate RP2 has a refractive index anisotropy of nz>nx>ny. This second retardation plate RP2 is formed of, for example, maleimide. In the second retardation plate RP2, the value of the second retardation Re2 is 55.3 nm, and the value of the second retardation Rth2 is −88.4 nm. Thus, as regards the first retardation plate RP1 and second retardation plate RP2, the sum Re(sum) of the retardations Re is 131.6 nm, and the sum Rth(sum) of the retardations Rth is −22.4 nm. In Modification 3, the retardation plate having a positive retardation Rth, or the retardation plate having a refractive index anisotropy of nx>ny>nz, is the first retardation plate RP1. Accordingly, in Modification 3, the contribution degree CNT2 of the first retardation Rth1, if calculated from the above-described equation, is 42.7%.

As regards Modifications 1 to 3 of the present embodiment, the viewing angle characteristics of the contrast ratio and the viewing angle characteristics of the gray level inversion were simulated, and the same results as shown in FIG. 8 and FIG. 9 were obtained.

Comparative Example 1 corresponds to the structure in which neither the first retardation plate nor second retardation plate of the present embodiment is provided. Thus, each of the sum Re(sum) of retardations Re and the sum Rth(sum) of retardations Rth is zero.

In Comparative Example 2, the first retardation plate RP1 has a refractive index anisotropy of nx=ny<nz. In the first retardation plate RP1, the value of the first retardation Re1 is 0 nm, and the value of the first retardation Rth1 is −170 nm. The second retardation plate RP2 has a refractive index anisotropy of nx>ny>nz. In the second retardation plate RP2, the value of the second retardation Ret is 90 nm, and the value of the second retardation Rth2 is 99 nm. Thus, as regards the first retardation plate RP1 and second retardation plate RP2, the sum Re(sum) of the retardations Re is 90 nm, and the sum Rth(sum) of the retardations Rth is −71 nm. In addition, the contribution degree CNT2 of the second retardation Rth2 is 36.8%.

FIG. 11 is a view showing a simulation result of the viewing angle characteristics of the contrast ratio in the liquid crystal display device of Comparative Example 1.

As regards regions where the contrast ratio is 100:1 or more, the following ranges of viewing angles were merely obtained: about 60° at 0° azimuth, about 30° at 45° azimuth, about 80° at 90° azimuth, about 35° at 135° azimuth, about 70° at 180° azimuth, about 35° at 225° azimuth, about 80° at 270° azimuth, and about 35° at 315° azimuth.

In addition, as regards regions where the contrast ratio is 10:1 or more, the ranges of viewing angles of about 60° were merely obtained at 45° azimuth, 135° azimuth, 225° azimuth, and 315° azimuth.

FIG. 12 is a view showing a simulation result of the viewing angle characteristics of the gray level inversion in the liquid crystal display device of Comparative Example 1.

As shown in FIG. 12, it was confirmed that gray level inversion occurs at 45° azimuth, 225° azimuth, and 315° azimuth. In particular, it was also confirmed that gray level inversion occurs in the range of the viewing angle of about 30° or more at 45° azimuth, gray level inversion occurs in the range of the viewing angle of about 60° or more at 225° azimuth, and gray level inversion occurs in the range of the viewing angle of about 45° or more at 315° azimuth.

It was thus confirmed that Comparative Example 1 is inferior to the present embodiment with respect to both the viewing angle characteristics of the contrast ratio and the viewing angle characteristics of the gray level inversion.

In the present embodiment and Comparative Example 1, the viewing angle variation of chromaticity was simulated. In this case, the variation of chromaticity was simulated when the viewing angle was increased from the direction parallel to the normal line of the liquid crystal display panel toward 45° azimuth, 135° azimuth, 225° azimuth, and 315° azimuth. According to simulation results in cases where black (L=0) of the lowest gray level of 256 gray levels was displayed, white (L=225) of the highest gray level was displayed, and an intermediate gray level (L=127) was displayed, it was confirmed that the variation of chromaticity is smaller in the present embodiment than in Comparative Example 1 in all azimuth directions.

Figure 13:
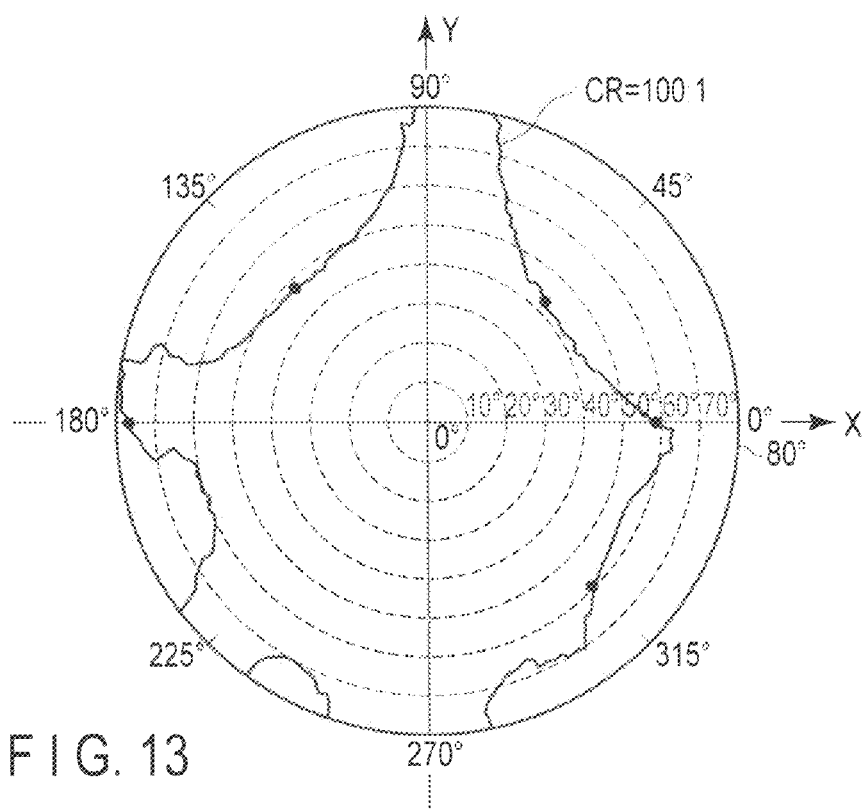
FIG. 13 shows a simulation result of viewing angle characteristics of the contrast ratio in a liquid crystal display device of Comparative Example 2.

FIG. 13 is a view showing a simulation result of the viewing angle characteristics of the contrast ratio in the liquid crystal display device of Comparative Example 2.

According to Comparative Example 2, it was confirmed that the contract ratio (CR) is 10:1 or more in all azimuth directions. In addition, as regards regions where the contrast ratio is 100:1 or more, it was confirmed that the following ranges of viewing angles can be obtained: about 60° at 0° azimuth, about 40° at 45° azimuth, about 80° at 90° azimuth, about 45° at 135° azimuth, about 75° at 180° azimuth, about 80° at 225° azimuth, about 80° at 270° azimuth, and about 60° at 315° azimuth.

Figure 14:
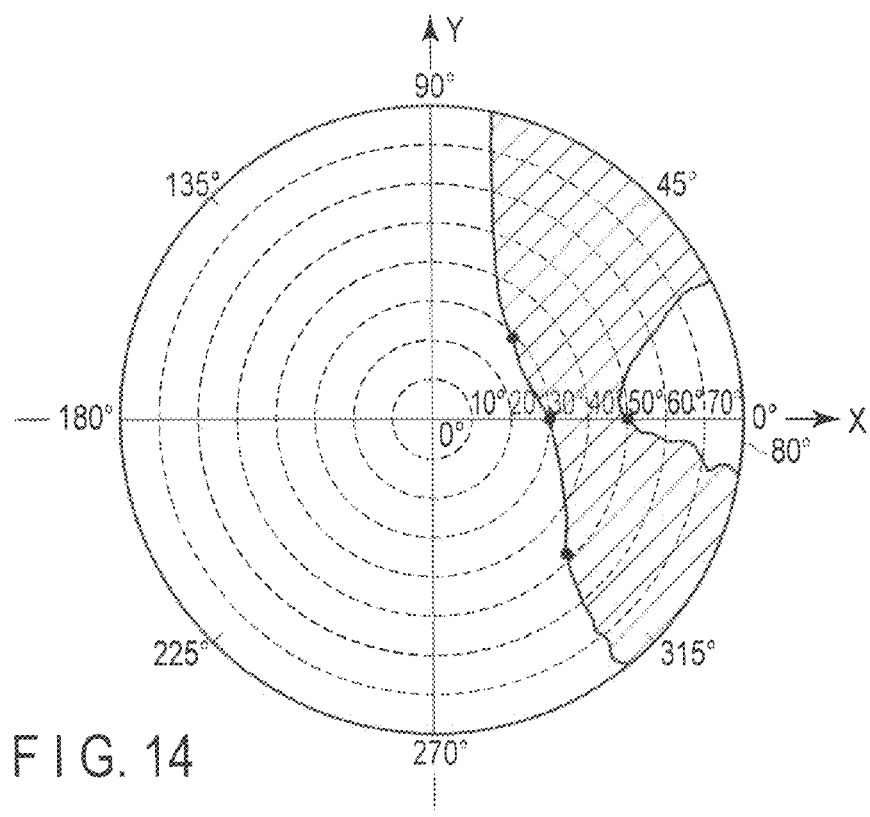
FIG. 14 shows a simulation result of viewing angle characteristics of the gray level inversion in the liquid crystal display device of Comparative Example 2.

FIG. 14 is a view showing a simulation result of the viewing angle characteristics of the gray level inversion in the liquid crystal display device of Comparative Example 2.

As shown in FIG. 14, it was confirmed that gray level inversion occurs at 45° azimuth and 315° azimuth. In particular, it was confirmed that gray level inversion occurs in the range of the viewing angle of about 30° or more at 45° azimuth, and gray level inversion occurs in the range of the viewing angle of about 60° or more at 315° azimuth. It was also confirmed that gray level inversion occurs in the range of about 30° to about 50° at 0° azimuth.

It was thus confirmed that in Comparative Example 2, compared to the present embodiment, substantially equal characteristics can be obtained with respect to the viewing angle characteristics of the contrast ratio, but Comparative Example 2 is inferior to the embodiment with respect to the viewing angle characteristics of the gray level inversion.

As has been described above, according to the present embodiment, a liquid crystal display device with a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    a first substrate comprising a first insulative substrate, a common electrode disposed on an inner surface side of the first insulative substrate, an insulation film covering the common electrode, a pixel electrode which is disposed above the insulation film, opposed to the common electrode and provided with a slit, and a first alignment film covering the pixel electrode;
    a second substrate comprising a second insulative substrate and a second alignment film disposed on an inner surface side of the second insulative substrate, the inner surface side of the second insulative substrate being opposed to the pixel electrode;
    a liquid crystal layer held between the first substrate and the second substrate;
    a first polarizer disposed on an outer surface side of the first insulative substrate;
    a second polarizer disposed on an outer surface side of the second insulative substrate; and
    a first retardation plate and a second retardation plate, which are stacked between the second insulative substrate and the second polarizer,
    wherein, with respect to the first retardation plate and the second retardation plate, when refractive indices in two directions, which are perpendicular to each other in a plane of each of the first retardation plate and the second retardation plate, are nx and ny, respectively, a refractive index in a thickness direction is nz, a thickness is d, and a retardation in the thickness direction, which is defined by $((nx+ny)/2-nz)*d$, is Rth, the first retardation plate has a negative first retardation Rth1, the second retardation plate has a positive second retardation Rth2, a sum of the first retardation Rth1 and the second retardation Rth2 is −40 nm±20 nm with respect to light with a wavelength of 550 nm, and a contribution degree of the second retardation Rth2, which is defined by $|Rth2|*100/(|Rth1|+|Rth2|)$, is 40%±3% wherein the second retardation plate has a refractive index anisotropy of nx>ny>nz.

2. The liquid crystal display device of claim 1, wherein the first retardation plate has one of a refractive index anisotropy of nx=ny<nz and a refractive index anisotropy of nz>nx>ny.

3. The liquid crystal display device of claim 2, wherein when an in-plane retardation which is defined by (nx−ny)*d is Re, the first retardation plate has a retardation Re1, and the second retardation plate has a retardation Re2, a sum of the retardation Re1 of the first retardation plate and the retardation Re2 of the second retardation plate is 115 nm±15 nm with respect to light with a wavelength of 550 nm.

4. The liquid crystal display device of claim 2, wherein the first retardation plate is formed of a material which is different from a material of the second retardation plate.

5. The liquid crystal display device of claim 2, wherein the first retardation plate has wavelength dispersion characteristics which are different from wavelength dispersion characteristics of the second retardation plate.

6. The liquid crystal display device of claim 1, wherein a first alignment treatment direction of the first alignment film is parallel to, and opposite to, a second alignment treatment direction of the second alignment film,
the first polarizer has a first absorption axis which is substantially parallel to the first alignment treatment direction, and
the second polarizer has a second absorption axis which is substantially perpendicular to the first alignment treatment direction.

7. The liquid crystal display device of claim 6, wherein an optical axis in the plane of the second retardation plate is substantially perpendicular to the second absorption axis.

8. The liquid crystal display device of claim 6, wherein the slit extends in a linear shape substantially in parallel to a direction which is displaced by 5° to 10° relative to the first alignment treatment direction.

9. The liquid crystal display device of claim 1, wherein the first substrate further comprises a source line extending in a direction substantially parallel to the slit, and a gate line extending in a direction substantially perpendicular to the source line.

10. The liquid crystal display device of claim 1, wherein in a state in which an electric field is produced between the pixel electrode and the common electrode, the liquid crystal layer has a retardation which corresponds to a ½ wavelength.

11. The liquid crystal display device of claim 1, wherein in a state in which no electric field is produced between the pixel electrode and the common electrode, the liquid crystal layer has a retardation of 300 nm to 350 nm with respect to light with a wavelength of 550 nm.

12. A liquid crystal display device comprising:
a first substrate comprising a first insulative substrate, a common electrode disposed on an inner surface side of the first insulative substrate, an insulation film covering the common electrode, a pixel electrode which is disposed above the insulation film, opposed to the common electrode and provided with a slit, and a first alignment film covering the pixel electrode;
a second substrate comprising a second insulative substrate and a second alignment film disposed on an inner surface side of the second insulative substrate, the inner surface side of the second insulative substrate being opposed to the pixel electrode;
a liquid crystal layer held between the first substrate and the second substrate;
a first polarizer disposed on an outer surface side of the first insulative substrate;
a second polarizer disposed on an outer surface side of the second insulative substrate; and
a first retardation plate and a second retardation plate, which are stacked between the second insulative substrate and the second polarizer,
wherein, with respect to the first retardation plate and the second retardation plate, when refractive indices in two directions, which are perpendicular to each other in a plane of each of the first retardation plate and the second retardation plate, are nx and ny, respectively, a refractive index in a thickness direction is nz, and a thickness is d, the first retardation plate has one of a refractive index anisotropy of nx=ny<nz and a refractive index anisotropy of nz>nx>ny, and the second retardation plate has a refractive index anisotropy of nx>ny>nz,
when a retardation in the thickness direction, which is defined by ((nx+ny)/2−nz)*d, is Rth, the first retardation plate has a first retardation Rth1 and the second retardation plate has a second retardation Rth2, and
a contribution degree of the second retardation Rth2, which is defined by |Rth2|*100/(|Rth1|+|Rth2|), is 40%±3%,
wherein a sum of the first retardation Rth1 and the second retardation Rth2 is −40 nm±20 nm with respect to light with a wavelength of 550 nm.

13. The liquid crystal display device of claim 12, wherein when an in-plane retardation which is defined by (nx−ny)*d is Re, the first retardation plate has a retardation Re1, and the second retardation plate has a retardation Re2, a sum of the retardation Re1 of the first retardation plate and the retardation Re2 of the second retardation plate is 115 nm±15 nm with respect to light with a wavelength of 550 nm.

14. The liquid crystal display device of claim 12, wherein a first alignment treatment direction of the first alignment film is parallel to, and opposite to, a second alignment treatment direction of the second alignment film,
the first polarizer has a first absorption axis which is substantially parallel to the first alignment treatment direction, and
the second polarizer has a second absorption axis which is substantially perpendicular to the first alignment treatment direction.

15. The liquid crystal display device of claim 14, wherein an optical axis in the plane of the second retardation plate is substantially perpendicular to the second absorption axis.

16. The liquid crystal display device of claim 14, wherein the slit extends in a linear shape substantially in parallel to a direction which is displaced by 5° to 10° relative to the first alignment treatment direction.

* * * * *